(No Model.)

J. W. HARRIS.
STREET CAR FENDER.

No. 552,286. Patented Dec. 31, 1895.

WITNESSES
Jos. C. Stack
Edwin L. Bradford

INVENTOR
John W. Harris,
by Finckel & Finckel
Attorneys

UNITED STATES PATENT OFFICE.

JOHN W. HARRIS, OF COLUMBUS, OHIO.

STREET-CAR FENDER.

SPECIFICATION forming part of Letters Patent No. 552,286, dated December 31, 1895.

Application filed October 7, 1895. Serial No. 564,874. (No model.)

*To all whom it may concern:*

Be it known that I, JOHN W. HARRIS, a citizen of the United States, residing at Columbus, in the county of Franklin and State of Ohio, have invented certain new and useful Improvements in Street-Car Fenders; and I do hereby declare the following to be a full, clear, and exact description of the invention, such as will enable others skilled in the art to which it appertains to make and use the same.

The object of my invention is to provide a simple, cheap, and effective device of the kind now known as a "fender," which is placed in front of a car for the purpose of catching and holding a person in case of collision, thereby preventing the injury or death usually incident to such accidents.

In many, if not most, of the fenders heretofore devised the front edge of the fender is fixedly inclined downwardly toward the rail. While it is important that the front edge be so inclined there is considerable tendency of the person caught to roll or fall out onto the track in front of the car, so I have devised a construction whereby this inclined front edge is elevated as soon as a person falls into the fender, thus forming a trough or basket in which the person rests with safety.

Figure 1:
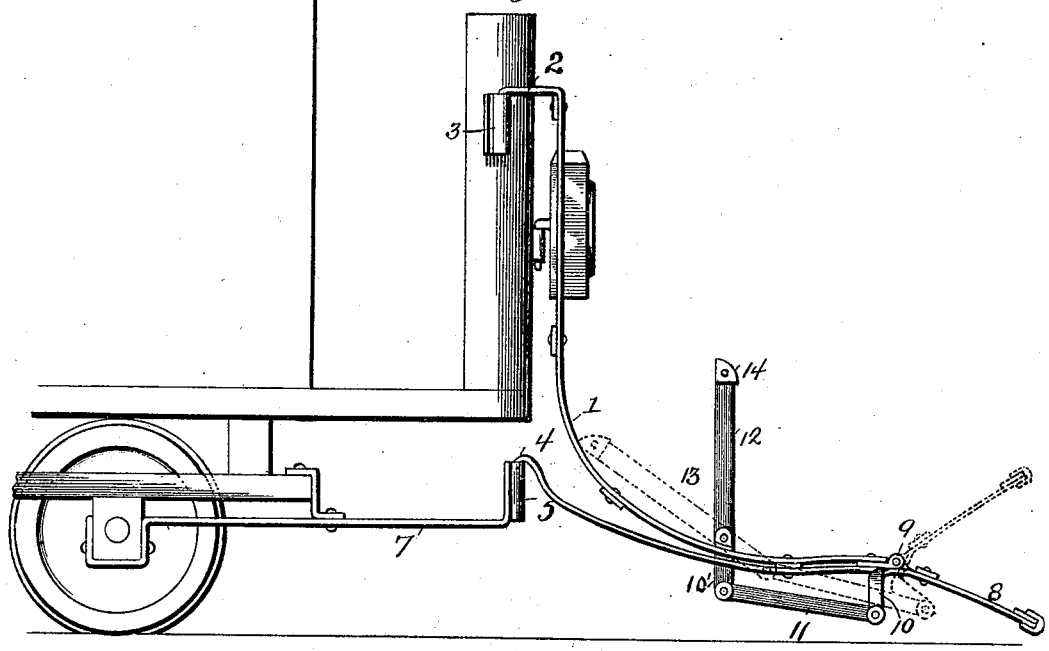
Figure 2:
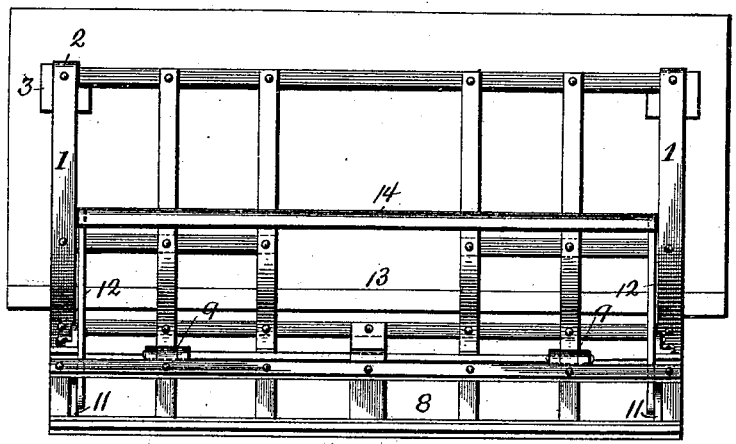

In the annexed drawings, in which I have illustrated an embodiment of my invention, Figure 1 is a view in side elevation, and Fig. 2 is a view in front elevation.

1 designates the main frame of the fender, the upper rear side or part of which is furnished with suitable hooks 2 to engage sockets 3 on the dashboard of the car. The lower part of this main frame is supported by hooks 4, which enter sockets 5 on brackets 7 attached in any suitable manner to the truck.

8 designates a frame-like tongue which is hinged, as shown at 9, to the front edge of the main frame 1 and which normally hangs at an incline toward the track. The rear part of this hinged tongue is provided with downwardly-projecting arms 10 that are pivotally connected by means of a link or rod 11 with the short arms 10' of a lever-like frame 13. This frame 13 comprises the side bars 12 and a cross-piece 14 rounded on its front side connecting the upper ends of the side bars. The side bars 12 are pivoted to lugs projecting upwardly from the side of the main frame.

The link 11 is made of such a length that the lever-like frame 13 stands vertically, or nearly so, and when a person is caught or falls upon the fender the lever-like frame is thrown rearwardly by the weight of the person and the tongue or forward part of the fender 8 is thrown upwardly, as shown by broken lines, so that the forward part 8 and the lever-like frame 13 together form a trough-like structure into which the person is safely lodged. The action of the forward part of the fender tends also to throw the legs of the fallen person upwardly from the track, thus insuring the safety of those members from injury by pinching between the track and the forward part of the fender.

What I claim as new, and desire to secure by Letters Patent, is—

A car fender comprising a main frame, a front part or tongue hinged to the main frame and having a downwardly projecting arm or lug 10, a lever-like frame 13 pivoted at or near the bottom of the main frame and having an arm or lug 10', and a link 11 connecting the arms 10 and 10', substantially as shown and described.

In testimony whereof I affix my signature in presence of two witnesses.

JOHN W. HARRIS.

Witnesses:
GEORGE M. FINCKEL,
PATRICK J. SINGLETON.